No. 892,314. PATENTED JUNE 30, 1908.
F. C. SCHULTZ.
MACHINE FOR SAWING STANDING TIMBER.
APPLICATION FILED APR. 26, 1907.
3 SHEETS—SHEET 1.
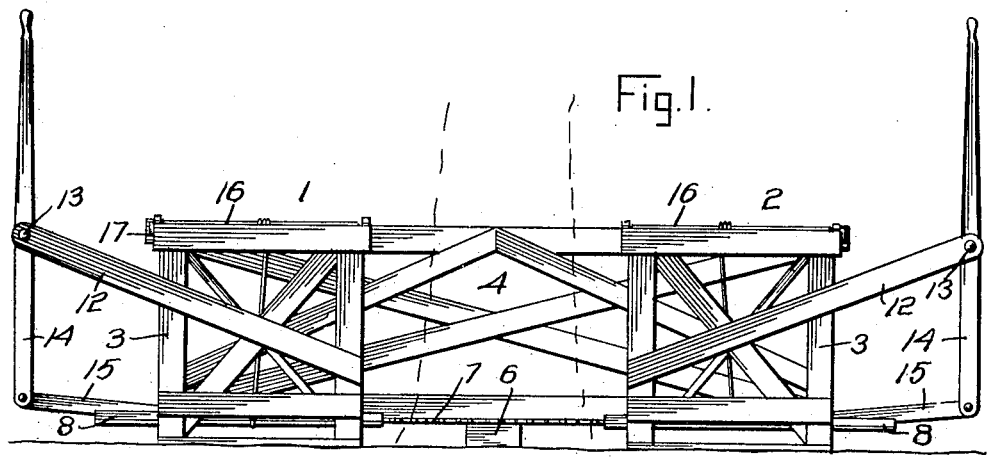
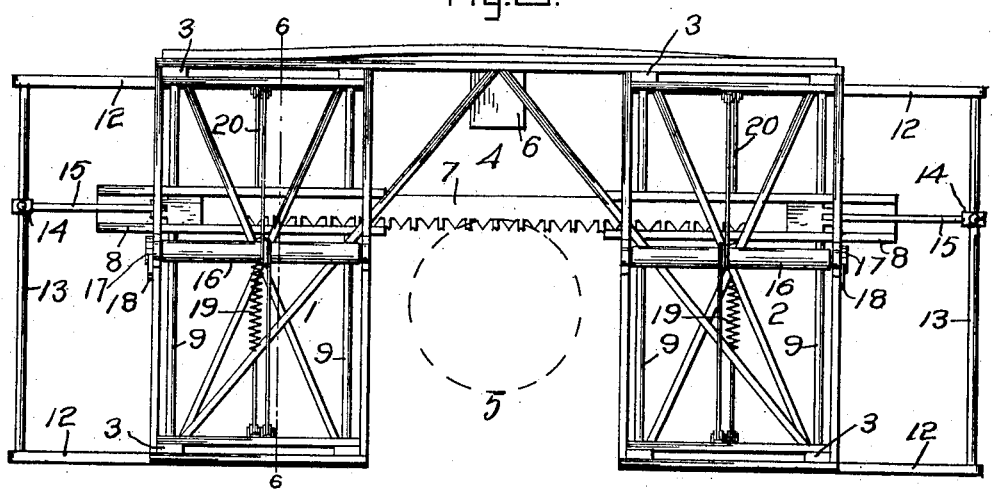
Witnesses
Inventor
Frank C. Schultz
Attorney

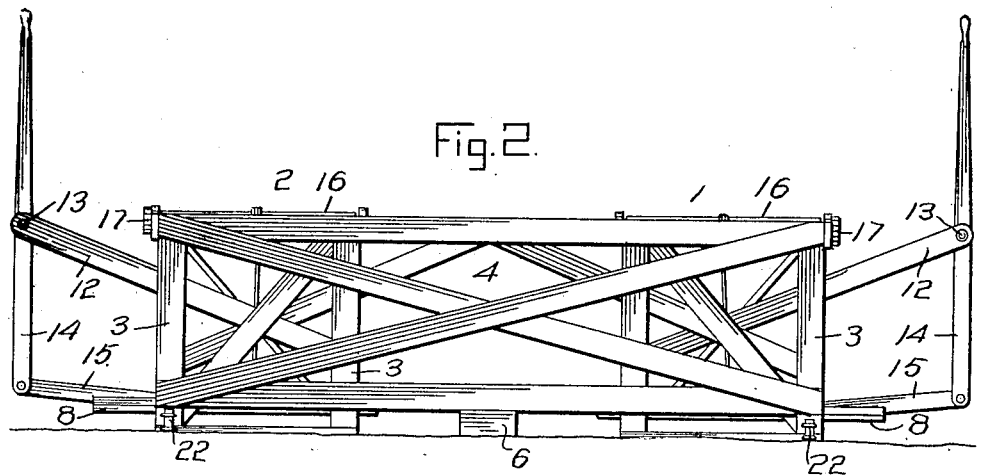
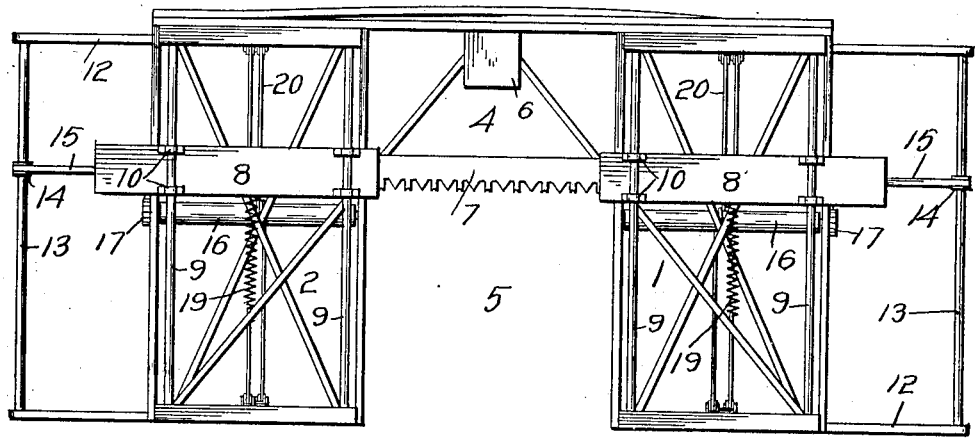

No. 892,314. PATENTED JUNE 30, 1908.
F. C. SCHULTZ.
MACHINE FOR SAWING STANDING TIMBER.
APPLICATION FILED APR. 26, 1907.
3 SHEETS—SHEET 3.
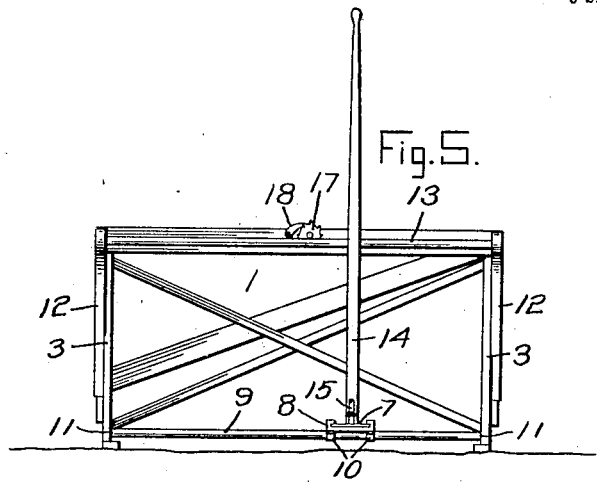
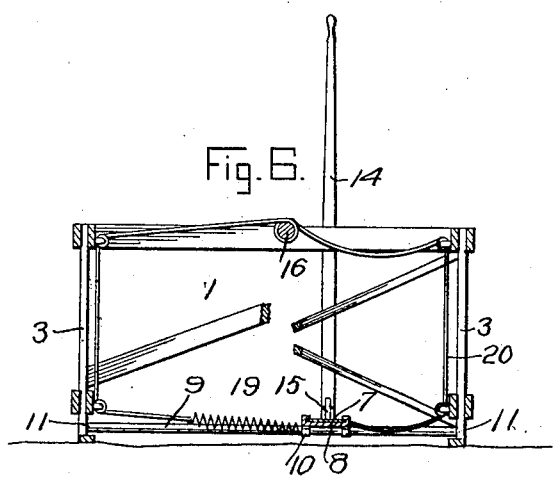
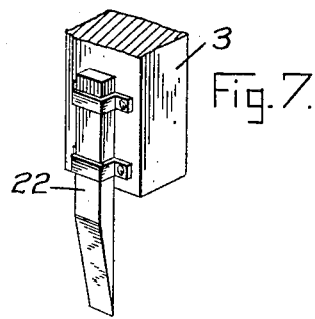
Witnesses
Inventor
Frank C. Schultz
By
Attorneys

UNITED STATES PATENT OFFICE.

FRANK C. SCHULTZ, OF BLAND, MISSOURI.

MACHINE FOR SAWING STANDING TIMBER.

No. 892,314.  Specification of Letters Patent.  Patented June 30, 1908.

Application filed April 26, 1907. Serial No. 370,386.

*To all whom it may concern:*

Be it known that I, FRANK C. SCHULTZ, a citizen of the United States, residing at Bland, in the county of Gasconade, State of Missouri, have invented certain new and useful Improvements in Machines for Sawing Standing Timber; and I do hereby declare the following to be a full, clear, and exact description of the invention, such as will enable others skilled in the art to which it appertains to make and use the same.

This invention has relation to machines for sawing down standing timber or trees.

It is the object of the invention to provide a machine in which the saw may be operated horizontally near the surface of the ground, while the persons working it may stand erect; so that the saw may be easily and efficiently operated, and low stumps left from the trees felled, an important matter where ground is cleared for tillage purposes.

It is also the object of the invention to provide other improvements in connection with the foregoing, as will fully appear from this specification.

The nature of the invention is ascertainable from the device portrayed in the annexed drawings, forming a part of this specification, in view of which it will first be described in detail with respect to its construction and mode of operation, and then be particularly pointed out in the subjoined claims.

Of the said drawings—Figure 1 is a front elevation. Fig. 2 is a rear elevation. Fig. 3 is a plan. Fig. 4 is a bottom view. Fig. 5 is an end elevation. Fig. 6 is a section from front to rear in the plane 5 5, Fig. 3. Fig. 7 is a fragment of the lower end of one of the legs at a corner of the frame.

Similar numerals of reference designate similar parts or features, as the case may be, wherever they occur.

In the drawings 1 and 2 designate two rectangular frames of suitable width, length and height that are composed of timber and comprise corner-posts 3, top and bottom bars and brace-bars as may be necessary. The said two frames are connected at the rear of what, for the purposes of this specification, merely, will be called a third or "middle" frame, 4, formed of bars and braces connected with the sides of the frames 2 and 3, and at the extreme rear some of the timbers and brace-bars may extend across all three frames, in order to strengthen and stiffen the entire structure. The middle frame will be quite narrow—that is, it will extend but a short distance from rear to front, leaving a gap, 5, between the two side frames 1 and 2 in front of the middle frame. This construction is provided in order that the side frames may be set on opposite sides of the tree to be felled, the latter occupying the gap 5.

In order to assist in steadying the structure, it is desirable that the middle frame should rest upon and be connected with a relatively large and heavy base-block 6.

7 designates the saw which is horizontally arranged, its teeth extending forward and its body slidably supported upon relatively large and heavy blocks or timbers 8. The said blocks may extend from the inner side frames to some distance beyond the outer sides of said frames, the body of the saw extending across the gap 5. Extending from front to rear of the side frames are metallic rods, 9, adjusted and fixed in the said frames as near the ground as it may be desired to cut the tree. In the present machine the said rods are capable of being arranged as low as two or three inches from the surface of the ground which is the height that the stump would have from the tree felled by the machine. The said saw-supporting blocks 8 are provided with bearings on their opposite sides on the rods 9; and clips 10, rounded at their centers to fit under and about the said rods 9, are secured at their ends to the blocks at the opposite sides of the bearings 11 for the rods, so that as the saw-bearing blocks are moved longitudinally on the rods, as will hereinafter appear, to carry the saw forward to its work, said blocks may be properly guided and kept in place. The blocks 8 are made large and heavy in order to steady the movement of the saw preventing it, among other things from vibrating.

12 designates bars connected with the front and rear of the side frames and extending some distance beyond the sides of the latter and connected at their outer ends by rods 13. Upon the said rods 13 are fulcrumed vertically disposed levers 14 that are pivotally connected at their lower ends with the outer ends of rods or bars 15, which at their inner ends are connected with the ends of the saw 7, supported on the blocks.

It will now be seen that with the frames in position, so that the tree to be felled will occupy the gap 5, persons standing on opposite sides of the frames, by taking hold of the levers 14 and operating them in an obvious way will reciprocate the saw, so that the latter with its supporting blocks when moved or fed against the tree, and pressed continuously, will saw through it and cut it down.

The blocks or saw-carriers 8, bearing on the rods 9 may be easily moved longitudinally of said rods, and the clips 10 will keep the saw-carriers in proper position and insure the straight movement of the carriers on the rod in feeding the saw forward.

Various contrivances may be employed for feeding the saw forward to have it cut into the tree. The means shown in the drawings that have been found efficient and generally satisfactory consist of a roller, 16, supported in each of the side frames and provided on one end with a ratchet-wheel 17 engaged by a pawl 18 so as to prevent the roller from turning back when the saw is in operation.

19 designates strong retractile springs secured at one end to each of the saw-bearing blocks 11 and having a cord or rope attached to the other end, forming a practical continuance of the spring, the said cord being carried forward and up around suitable pulleys to the said roller 16 around which it is wrapped one or more times and then secured thereto. 20 designates cords one end of which is also secured to each of the saw-bearing blocks and is led rearward around suitable guide-rods, and its free end carried forward and secured to the rollers 16. The cords will be wound on the rollers 16, so that as the latter is turned one cord will be wound on the rollers while the other will be unwound therefrom; and the cords will be adjusted so as to put the springs 19 under tension that will operate to move the saw-bearing blocks and the saw forward to its work, and so that as the spring retracts the cord connected therewith will be wound on the roller with which it is connected while the other cord connected with the said roller will be unwound. When the pawl is in engagement with the ratchet-wheel on the roller the spring will not act upon the saw-bearings to move them because of being held back by the cords 20 which will not be paid out or unwound from the said rollers.

In making ready to begin the work of sawing down a tree, the saw and its bearings will be drawn fully back, with the teeth of the saw against the tree or other object to be operated upon. In this condition the frame will be adjusted accordingly, the pawl 18, will be engaged with the ratchet wheel 17, and the slack in the cord 20 in front of the saw and roller 16 will be taken up by operating the said roller so as to wind the slack upon it in front and pay it out in the rear, when the sawing may begin and be proceeded with, the saw being automatically fed forward until the tension put upon the spring is exhausted. If the work is not finished at or before this time, by further winding up the portion of the cord 20 in front of the roller 16 and paying the slack out at the rear the spring will be put under further tension to automatically feed the saw forward until the work is fully accomplished. In Fig. 6 the parts are represented as indicating the spring under a degree of tension. When the sawing is finished the cord will be manipulated and the ratchet and pawl employed to adjust the saw and saw bearings to normal position.

While I have shown and described the frames as having definite forms and structures, it is obvious that they may be differently arranged and constructed so long as they are made capable of performing the functions herein ascribed to them. My invention, however, is to be understood as confined to a saw adapted to be operated horizontally on upright or approximately upright timber, in contradistinction to drag-sawing and other machines where the saw operates vertically to saw or cut fallen logs or timber which lie horizontally or nearly so.

In cases where it is necessary to fix the frame to the ground, it is proposed to clamp pins 22 of metal on the lower ends of the legs and force them into the ground so as to steady the frame and keep it from being moved back by the pressure of the saw when at work, as is shown in Fig. 9.

What is claimed is—

1. A machine for sawing standing timber comprising a frame, having a gap in the central portion of its forward side, said gap being open in front and closed at the rear, means for anchoring the frame in position; a saw, and its carriers, means for supporting the same in the frame across the gap at a relatively low level, a roller journaled in the frame on each side opposite the gap, at a relatively high level, a connected cord and spring attached to said saw-carrier, pulleys supported by the frame, the cord being passed about said pulleys and wrapped on said roller to operate it and put the spring under tension and means for operating the saw and its carriers.

2. A machine for sawing standing timber comprising a frame, having a gap in the central portion of its forward side, said gap being open in front and closed at the rear, means for anchoring the frame in position, a saw, and its carriers, means for supporting the same in the frame across the gap at a relatively low level, a roller journaled in the frame on each side opposite the gap, at a relatively high level, a connected cord and spring attached to said saw-carriers, pulleys supported by the frame, the cord being passed about said pulleys and wrapped on said roller to operate it and put the spring under tension, upright levers connected at their lower ends with the saw-carriers and saw to reciprocate the same, and means for operating the saw and its carriers.

In testimony whereof, I affix my signature, in presence of two witnesses.

FRANK C. SCHULTZ.

Witnesses:
LOUIS RITTERBUSCH,
W. H. SASSMANN.